US010626043B2

(12) United States Patent
Lambricht et al.

(10) Patent No.: US 10,626,043 B2
(45) Date of Patent: *Apr. 21, 2020

(54) GLASS SHEET HAVING HIGH TRANSMISSION OF INFRARED RADIATION

(71) Applicant: AGC GLASS EUROPE, Louvain-la-Neuve (BE)

(72) Inventors: Thomas Lambricht, Perwez (BE); Audrey Dogimont, Sart-Dames-Avelines (BE); Aline Degand, Bleret (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/737,098

(22) PCT Filed: Jun. 3, 2016

(86) PCT No.: PCT/EP2016/062591
§ 371 (c)(1),
(2) Date: Dec. 15, 2017

(87) PCT Pub. No.: WO2016/202606
PCT Pub. Date: Dec. 22, 2016

(65) Prior Publication Data
US 2018/0170793 A1 Jun. 21, 2018

(30) Foreign Application Priority Data
Jun. 18, 2015 (EP) .................................. 15172780

(51) Int. Cl.
*C03C 3/087* (2006.01)
*C03C 4/02* (2006.01)
*C03C 4/10* (2006.01)
*C03C 3/091* (2006.01)
*G06F 3/042* (2006.01)

(52) U.S. Cl.
CPC .............. *C03C 3/087* (2013.01); *C03C 3/091* (2013.01); *C03C 4/02* (2013.01); *C03C 4/10* (2013.01); *G06F 3/0421* (2013.01); *G06F 2203/04109* (2013.01)

(58) Field of Classification Search
CPC .................. C03C 3/087; C03C 3/091
See application file for complete search history.

(56) References Cited

U.S. PATENT DOCUMENTS

| | | | | |
|---|---|---|---|---|
| 4,101,705 A * | 7/1978 | Fischer | ............. | B32B 17/10339 428/220 |
| 4,104,076 A | 8/1978 | Pons | | |
| 5,023,210 A * | 6/1991 | Krumwiede | ............. | C03C 3/087 501/71 |
| 5,545,596 A * | 8/1996 | Alvarez Casariego | | ...................... C03C 3/087 501/70 |
| 7,534,735 B2 * | 5/2009 | Coster | ...................... | C03C 3/087 501/70 |
| 9,950,946 B2 * | 4/2018 | Dogimont | ............... | C03C 3/087 |
| 2005/0032624 A1 | 2/2005 | Teyssedre et al. | | |
| 2005/0164863 A1 | 7/2005 | Coster et al. | | |
| 2007/0243993 A1 | 10/2007 | Heithoff et al. | | |
| 2008/0131628 A1 * | 6/2008 | Abensour | ............... | C03C 3/087 428/34 |
| 2009/0042712 A1 | 2/2009 | Teyssedre et al. | | |
| 2010/0113246 A1 | 5/2010 | Teyssedre et al. | | |
| 2012/0315410 A1 | 12/2012 | Heithoff et al. | | |
| 2014/0017500 A1 | 1/2014 | Koike et al. | | |
| 2014/0092052 A1 * | 4/2014 | Grunthaner | ............. | G06F 3/044 345/174 |
| 2014/0154440 A1 | 6/2014 | Iida et al. | | |
| 2016/0304389 A1 * | 10/2016 | Dogimont | ................ | C03C 4/10 |
| 2018/0170013 A1 * | 6/2018 | Hubert | ............. | B32B 17/10036 |
| 2018/0170014 A1 * | 6/2018 | Lambricht | ........ | B32B 17/10036 |
| 2018/0170794 A1 * | 6/2018 | Lambricht | ............. | C03C 3/087 |
| 2018/0194667 A1 * | 7/2018 | Lambricht | ............. | C03C 3/087 |

FOREIGN PATENT DOCUMENTS

| | | | | |
|---|---|---|---|---|
| FR | 2 833 590 A1 | 6/2003 | | |
| JP | 2001019470 A * | 1/2001 | ............. | C03C 3/087 |
| WO | WO 02/30842 A1 | 4/2002 | | |
| WO | WO-2015091106 A1 * | 6/2015 | ............. | C03C 3/087 |

OTHER PUBLICATIONS

International Search Report dated Aug. 4, 2016 in PCT/EP2016/062591 filed Jun. 3, 2016.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

A coloured glass sheet having a high transmission of infrared (IR) radiation, the composition comprising, in a content expressed as percentages by total weight of glass:

Figure 1:
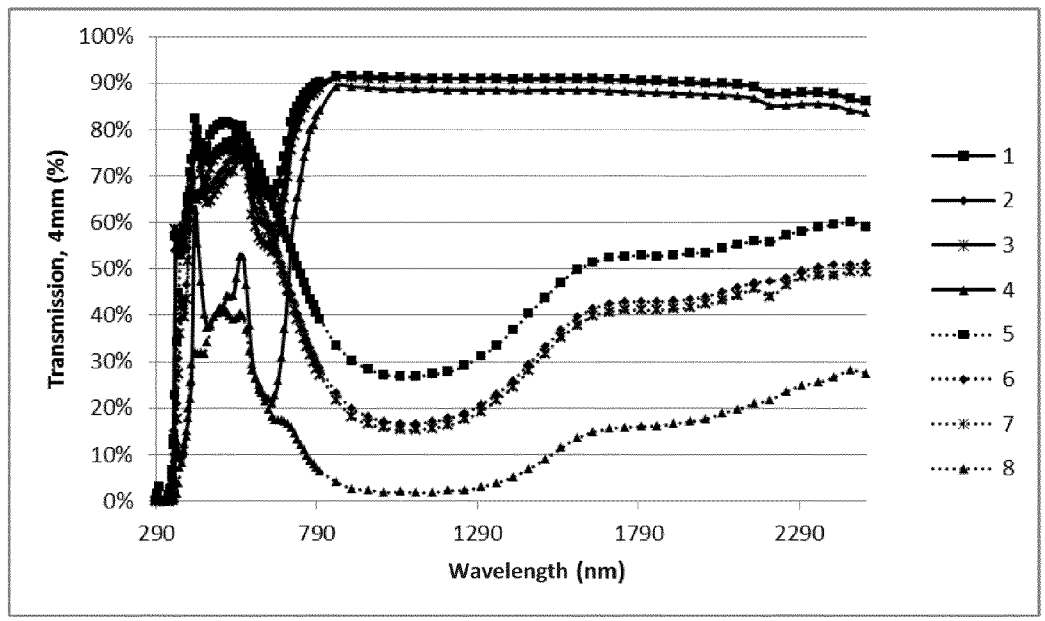
Figure 1:
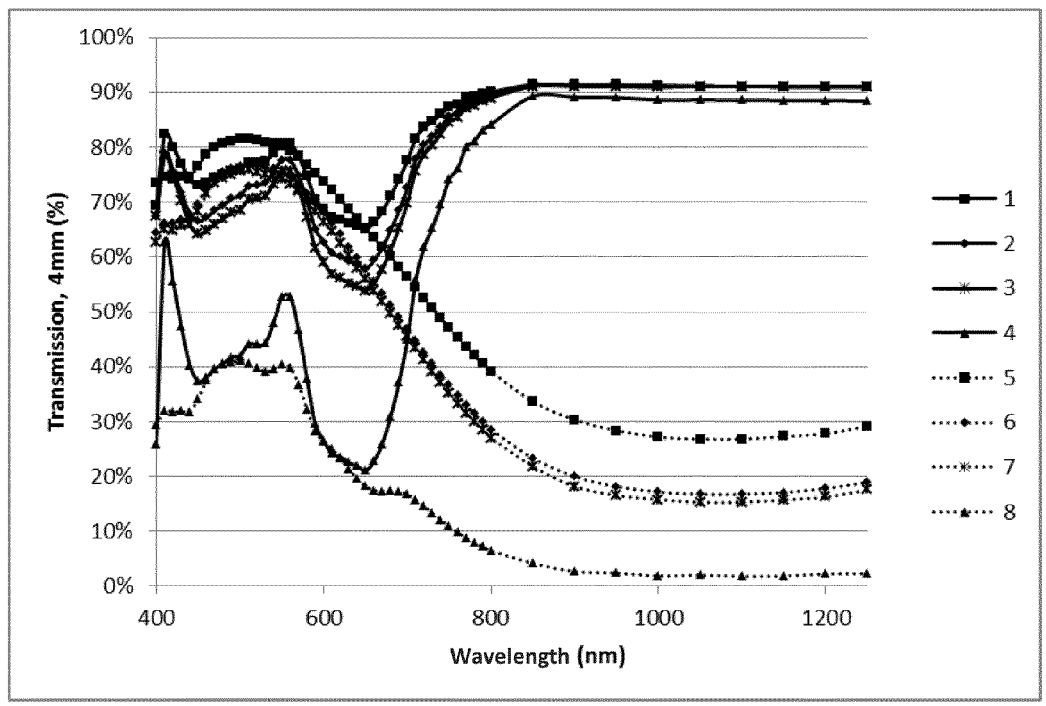

| | |
|---|---|
| SiO$_2$ | 55-85% |
| Al$_2$O$_3$ | 0-30% |
| B$_2$O$_3$ | 0-20% |
| Na$_2$O | 0-25% |
| CaO | 0-20% |
| MgO | 0-15% |
| K$_2$O | 0-20% |
| total iron (expressed in Fe$_2$O$_3$ form) | 0.02-1% |
| Co | 0.0001-0.5% |
| Cr$_2$O$_3$ | 0.002-0.5%; | said sheet having: TIR4>TLD4.
The glass sheet can advantageously have a blue or green shade and be used in a device requiring very good transmission of IR radiation.

19 Claims, 3 Drawing Sheets

(a)

(b)

(a)

(b)

(a)

(b)

GLASS SHEET HAVING HIGH TRANSMISSION OF INFRARED RADIATION

1. FIELD OF THE INVENTION

The present invention relates to a coloured glass sheet having a high transmission of infrared radiation. In particular, the present invention relates to a coloured glass sheet of green to blue shade having a high transmission of infrared radiation.

The glass sheet according to the invention can thus be advantageously used in any device requiring coloured glass panels more or less large in size and using a technology requiring very good transmission of infrared radiation through said panels, whether through the main faces or starting from their edge. For example, the coloured glass sheet according to the invention can advantageously be used in a touchscreen or touch panel or touchpad using the optical technology referred to as Planar Scatter Detection (PSD) or also Frustrated Total Internal Reflection (FTIR) (or any other technology using IR radiation in the edge of the glass) in order to detect the position of one or more objects (for example, a finger or a stylus) on a surface of said sheet. The invention consequently also relates to the use of such a glass sheet in a device using infrared radiation propagating essentially inside said sheet.

Although it is not limited to such applications, the invention will more particularly be described with regard to the use in a touchscreen or touch panel or touchpad using the optical technology referred to as Planar Scatter Detection (PSD) or also Frustrated Total Internal Reflection (FTIR).

2. SOLUTIONS OF THE PRIOR ART

The PSD and FTIR technologies make it possible to obtain multiple-detection touchscreens/touch panels which are inexpensive and which may have a relatively large touch surface (for example, from 3 to 100 inches) while being thin.

These two technologies involve:
(i) the injection of infrared (IR) radiation, for example by virtue of LEDs, into a substrate transparent to infrared radiation starting from one or more edges;
(ii) the propagation of the infrared radiation inside said substrate (which then acts as waveguide) via an optical phenomenon of total internal reflection (no radiation "exits" the substrate);
(iii) the contact of the surface of the substrate with any object (for example, a finger or a stylus), resulting in a local perturbation by scattering of the radiation in all directions; some of the deflected rays will thus be able "to exit" the substrate.

In the FTIR technology, the deflected rays form an infrared light spot on the lower surface of the substrate, opposite the touch surface. These are seen by a special camera located below the device.

The PSD technology for its part involves two additional stages subsequent to stages (i)-(iii):
(iv) the analysis by a detector of the resulting IR radiation at the edge of the substrate; and
(v) the calculation by algorithms, starting from the radiation detected, of the position(s) of the object(s) in contact with the surface. This technology is set out in particular in the document US2013021300A1.

Basically, glass is a material of choice for touch panels as a result of its mechanical properties, its durability, its resistance to scratching and its optical clarity and because it can be chemically or thermally strengthened.

In the case of glass panels used for the PSD or FTIR technology and with a very large surface and thus with a relatively great length/width, the IR radiation injected has a long optical path length. In this case, the absorption of the IR radiation by the material of the glass thus significantly influences the sensitivity of the touch panel, which may then undesirably decrease in the length/width of the panel. In the case of glass panels used for the PSD or FTIR technology and with a smaller surface and thus with a shorter optical path length of the IR radiation injected, the absorption of the IR radiation by the material of the glass also has an influence, in particular on the energy consumption of the device incorporating the glass panel.

Thus, a glass sheet highly transparent to infrared radiation is very useful in this context, in order to guarantee an intact or sufficient sensitivity over the entire touch surface when this surface is large. In particular, a glass sheet with a coefficient of absorption in the range of wavelengths from 780 to 1200 nm (and more particularly from 850 to 1050 nm), generally used in these technologies, equal to or even less than 1 m$^{-1}$ is ideal and a value of less than 5 m$^{-1}$ is in itself very advantageous.

Outside of this context and in a general manner, coloured glass sheets of green to blue shade are often highly desired aesthetically in many applications, in construction, in decoration as well as in the motor vehicle field, optionally in combination with layers. Known examples of such glass sheets are given by the coloured Planibel® range, marketed by AGC Glass Europe, and comprising in particular several versions of blue glass (Planibel Azur, Dark Blue and Privablue) and several versions of green glass (in particular, Planibel Green). Such glasses are furthermore often chosen, especially in the motor vehicle field, in addition to their colour, for their properties of filtering high-energy (IR and/or UV) radiation. These known coloured glasses specifically make it possible to respond to considerations that are both aesthetic (via their colour) and energetic, in particular in the motor vehicle field where a low energy transmission makes it possible to limit overheating inside the vehicle. Generally, and in particular in the motor vehicle field, coloured glasses are thus found with an attractiveness that meet the current criteria but also with a high selectivity ($T_L/T_E$). In particular and by way of example, marketed blue glasses, such as Planibel Dark Blue and Privablue glasses, display a very low transmission of infrared radiation.

Thus, a glass sheet that is lightly to strongly coloured in the blue or green colour ranges but that is highly transparent to infrared radiation is not currently offered on the market and is however of significant interest for devices that require coloured panels and that use a technology that demands a very good transmission of IR radiation through said panels, whether through the main faces (the optical path length then corresponds to the thickness of the sheet) or starting from their edge and, specifically, for devices that use the PSD or FTIR technology.

In order to obtain high transmission in the infrared region (and in the visible region), it is known to reduce the total content of iron in the glass (expressed in terms of $Fe_2O_3$, according to the standard practice in the field), obtaining low-iron glasses. Glasses of silicates type always comprise iron as the latter is present as an impurity in the majority of the starting materials used (sand, limestone, dolomite, and the like). Iron exists in the structure of glass in the form of ferric $Fe^{3+}$ ions and ferrous $Fe^{2+}$ ions. The presence of ferric $Fe^{3+}$ ions confers, on the glass, a slight absorption of low-wavelength visible light and a stronger absorption in the near ultraviolet region (absorption band centred on 380 nm), while the presence of ferrous $Fe^{2+}$ ions (sometimes expressed as oxide FeO) results in a strong absorption in the near infrared region (broad absorption band centred on 1050 nm). Thus, the increase in the total iron content (in both its forms) accentuates the absorption in the visible region and in the infrared region. Furthermore, a high concentration of ferrous $Fe^{2+}$ ions results in a decrease in the transmission in the infrared region (in particular, the near infrared region). However, to achieve a coefficient of absorption in the range of wavelengths from 780 to 1200 nm which is sufficiently low for the touch applications by influencing only the total iron content would require such a great decrease in this total iron content that either (i) this would result in production costs which are much too high, due to the need for very pure starting materials (which sometimes even do not exist sufficiently pure), or (ii) this would present production problems (in particular the premature wear of the furnace and/or difficulties of heating the glass in the furnace).

It is also known, in order to further increase the transmission of the glass, to oxidize the iron present in the glass, that is to say to reduce the content of ferrous ions in favour of the content of ferric ions. The degree of oxidation of a glass is given by its redox, defined as the ratio by weight of $Fe^{2+}$ atoms with respect to the total weight of the iron atoms present in the glass, $Fe^{2+}$/total Fe.

In order to reduce the redox of the glass, it is known to add an oxidizing component to the batch of starting materials. However, the majority of the known oxidants (sulphates, nitrates, and the like) have an oxidizing power which is not sufficiently strong to achieve the IR transmission values desired in particular for the application of touch panels using the FTIR or PSD technology or have to be added in an excessively large amount with collateral disadvantages, such as cost, incompatibility with the production process, and the like.

Moreover, in order to obtain a glass sheet that is more or less intensely coloured, the practically universal solution is to use a glass composition based on colorants in relatively large amounts (especially the iron), but this conventional solution obviously leads to a significant degradation in the transmission of high-energy radiation and, in particular, infrared radiation.

3. OBJECTIVES OF THE INVENTION

One objective of the invention, in at least one of its embodiments, is to provide a coloured glass sheet of green to blue shade with a high transmission of infrared radiation. In particular, it is an objective of the invention to provide a coloured glass sheet of green to blue shade with a high transmission of near infrared radiation, in particular in the range of wavelengths from 780 to 1200 nm and more particularly from 850 to 1050 nm (range of interest for many technologies).

Another objective of the invention, in at least one of its embodiments, is to provide a coloured glass sheet of green to blue shade with an attractiveness suitable for the application chosen and/or market demand, while having a very good transmission of infrared radiation.

Another objective of the invention, in at least one of its embodiments, is to provide a coloured glass sheet of green to blue shade which is especially particularly enhanceable in value in a device using infrared radiation propagating essentially inside said sheet.

Another objective of the invention, in at least one of its embodiments, is to provide a coloured glass sheet which, when it is used as touch surface in large-sized touchscreens, touch panels or touchpads, results in no or little loss in sensitivity of the touch function.

Another objective of the invention, in at least one of its embodiments, is to provide a coloured glass sheet which, when it is used as touch surface in touchscreens, touch panels or touchpads of more modest sizes, is favourable to the energy consumption of the device.

Finally, another objective of the invention is to provide a coloured glass sheet with a high transmission of infrared radiation which is inexpensive to produce.

4. SUMMARY OF THE INVENTION

The invention relates to a coloured glass sheet having a composition which comprises, in a content expressed as percentages by total weight of glass:

| base elements: | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20% |
| total iron (expressed in $Fe_2O_3$ form) | 0.02-1% |
| Co | 0.0001-0.5% |
| $Cr_2O_3$ | 0.002-0.5%; | and said sheet having: TIR4>TLD4.

Thus, the invention is based on an entirely novel and inventive approach as it makes it possible to solve the technical problem posed. The inventors have in fact demonstrated that it was possible, by combining chromium and cobalt, in specific content ranges, in a glass composition, to obtain a coloured glass of green to blue shade that is highly aesthetically comparable with the blue or green glasses available on the market but while surprisingly obtaining a high transmission of IR radiation, significantly higher with respect to the coloured glass from the prior art, in particular in the range of wavelengths from 780 to 1200 nm. This approach is innovative in the field of coloured glasses for which a high selectivity ($T_L/T_E$) or, in other words, a low energy transmission (and indirectly a low transmission of IR radiation) is exclusively desired.

Throughout the present text, when a range is indicated, the end values are included. In addition, all the integer values and sub-ranges in a numerical range are expressly included as if explicitly written. Also throughout the present text, the content values are in percentages by weight, that is to say expressed with respect to the total weight of the glass, unless explicitly specified otherwise (for example, in ppm).

Also throughout the present text:
 the light transmission (expressed in %) is considered (according to the ISO 9050 standard) with the illuminant D65 for a glass sheet thickness of 4 mm (TLD4) at a solid observation angle of 2°, for a wavelength range between 380 and 780 nm;
 the IR transmission (expressed in %) is considered (according to the ISO 9050 standard) for a thickness of 4 mm (TIR4) and for a wavelength range between 780 and 2500 nm;
 the CIELab parameters L*a*b* (that characterize the colour of the glass sheet) are considered in transmission, for a thickness of 5 mm and with the illuminant D65 (10°).

Other features and advantages of the invention will become more clearly apparent on reading the following description, examples and figures.

The glass sheet according to the invention is made of glass which can belong to various categories. The glass can thus be a glass of soda-lime-silica, aluminosilicate or borosilicate type, and the like. Preferably, the composition of the glass sheet comprises, in a content expressed as percentages by total weight of glass, the following base elements:

| | |
|---|---|
| $SiO_2$ | 55-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5% |

More preferably and for reasons of lower production costs, the glass sheet according to the invention is a sheet of soda-lime-silica glass. Advantageously, according to this embodiment, the composition of the glass sheet comprises, in a content expressed as percentages by total weight of glass, the following base elements:

| | |
|---|---|
| $SiO_2$ | 60-75% |
| $Al_2O_3$ | 0-6% |
| $B_2O_3$ | 0-4% |
| CaO | 0-15% |
| MgO | 0-10% |
| $Na_2O$ | 5-20% |
| $K_2O$ | 0-10% |
| BaO | 0-5% |

The term "glass", within the meaning of the invention, is understood to mean a completely amorphous material, thus excluding any crystalline material, even partially crystalline material (such as, for example, glass-crystalline or glass-ceramic materials).

The glass sheet according to the invention can be a glass sheet obtained by a float process, a drawing process, a rolling process or any other process known to manufacture a glass sheet starting from a molten glass composition. According to a preferred embodiment according to the invention, the glass sheet is a float glass sheet. The term "float glass sheet" is understood to mean a glass sheet formed by the float process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

The glass sheet according to the invention can have varied and relatively large sizes. It can, for example, have sizes ranging up to 3.21 m×6 m or 3.21 m×5.50 m or 3.21 m×5.10 m or 3.21 m×4.50 m ("jumbo size" glass sheet) or also, for example, 3.21 m×2.55 m or 3.21 m×2.25 m ("lehr end size" glass sheet).

The glass sheet according to the invention can have a thickness varying between 0.1 and 25 mm. Advantageously, for applications such as touch panels, the glass sheet according to the invention can have a thickness varying between 0.1 and 6 mm. Preferably, in touchscreens, for reasons of weight, the thickness of the glass sheet according to the invention is from 0.1 to 2.2 mm. Alternatively, preferably, for any application other than screens, essentially for reasons of mechanical strength, the thickness of the glass sheet according to the invention is from 2.8 to 12 mm.

According to the invention, the composition comprises a total iron (expressed in terms of $Fe_2O_3$) content ranging from 0.02% to 1% by weight, with respect to the total weight of the glass. A total iron (expressed in the form of $Fe_2O_3$) content of less than or equal to 1% by weight makes it possible to retain a high transmission in the infrared region. The minimal value makes it possible not to adversely affect the cost of the glass due to the price of the iron-poor starting materials.

Preferably, the composition comprises a total iron (expressed in the form of $Fe_2O_3$) content such that: 0.06%<total iron ≤1%. More preferably, the composition comprises a total iron (expressed in the form of $Fe_2O_3$) content such that: 0.06%<total iron ≤0.7%, or better still 0.06%<total iron ≤0.3%. Even more preferably, the composition comprises a total iron (expressed in the form of $Fe_2O_3$) content such that: 0.06%<total iron ≤0.15%, or better still 0.06%<total iron ≤0.1%.

Alternatively, and also preferably, the composition comprises a total iron (expressed in the form of $Fe_2O_3$) content such that: 0.04%≤ total iron ≤1%. More preferably, the composition comprises a total iron (expressed in the form of $Fe_2O_3$) content such that: 0.04%≤ total iron ≤0.7%, or better still 0.04%≤ total iron ≤0.3%. Even more preferably, the composition comprises a total iron (expressed in the form of $Fe_2O_3$) content such that: 0.04%≤ total iron ≤0.15%, or better still 0.04%≤ total iron ≤0.1%. Most preferably, the composition comprises a total iron (expressed in the form of $Fe_2O_3$) content such that: 0.04%≤ total iron ≤0.06%.

Alternatively, and also preferably, the composition comprises a total iron (expressed in the form of $Fe_2O_3$) content such that: 0.02%≤ total iron ≤0.7%, or better still 0.02%≤ total iron ≤0.3%. Even more preferably, the composition comprises a total iron (expressed in the form of $Fe_2O_3$) content such that: 0.02%≤ total iron ≤0.15%, or better still 0.02%≤ total iron ≤0.1%. Most preferably, the composition comprises a total iron (expressed in the form of $Fe_2O_3$) content such that: 0.02%≤ total iron 0.06%.

According to one embodiment of the invention, the composition of the glass sheet comprises: total iron ≤5*$Cr_2O_3$ (the total iron being expressed in the form of $Fe_2O_3$ and the contents being expressed as percentages by weight). Preferably, the composition of the glass sheet comprises: total iron ≤4*$Cr_2O_3$. More preferably, the composition of the glass sheet comprises: total iron ≤3*$Cr_2O_3$. Very preferably, the composition of the glass sheet comprises: total iron ≤2*$Cr_2O_3$. Such iron-chromium ranges enable an almost complete oxidation of the ferrous iron to ferric iron over a wide range of industrial conditions, and therefore a maximized infrared transmission.

According to the invention, the composition comprises a cobalt (expressed in terms of Co) content ranging from 0.0001%-0.5% by weight, with respect to the total weight of the glass. Preferably, the composition comprises a cobalt (expressed in terms of Co) content ranging from 0.0001%-0.2% by weight, or even from 0.0001%-0.1% by weight. More preferably, the composition comprises a cobalt (expressed in terms of Co) content ranging from 0.0001%-0.05% by weight. More preferably still, the composition comprises a cobalt (expressed in terms of Co) content ranging from 0.0001%-0.025% by weight, with respect to the total weight of the glass. Most preferably, the composition comprises a cobalt (expressed in terms of Co) content ranging from 0.0001%-0.02% by weight, with respect to the total weight of the glass, or from 0.0001%-0.015% by weight, with respect to the total weight of the glass, or even better from 0.0001%-0.01% by weight, with respect to the total weight of the glass. Such cobalt ranges make it possible to achieve the desired colour without excessively degrading the light transmission.

According to the invention, the composition comprises a chromium (expressed in terms of $Cr_2O_3$) content ranging from 0.002%-0.5% by weight, with respect to the total weight of the glass. Preferably, the composition comprises a chromium (expressed in terms of $Cr_2O_3$) content ranging from 0.002%-0.25% by weight, with respect to the total weight of the glass, or even from 0.002%-0.15% by weight, with respect to the total weight of the glass. Even more preferably, the composition comprises a chromium (expressed in terms of $Cr_2O_3$) content ranging from 0.002%-0.1% by weight, with respect to the total weight of the glass, or even from 0.002%-0.075% by weight, with respect to the total weight of the glass, or even better from 0.002%-0.05% by weight, with respect to the total weight of the glass. Such chromium ranges make it possible to achieve the desired colour and also to guarantee an almost complete oxidation of the ferrous iron to ferric iron over a wide range of industrial conditions, and therefore a maximized infrared transmission.

According to one particularly advantageous embodiment of the invention, the composition comprises: $3*Co<Cr_2O_3<8*Co$. Such ranges of contents of chromium and cobalt make it possible to obtain a glass sheet of pleasant, substantially blue colour, that is coloured more or less intensively to opaque, with little or no transmission in the visible region, while maintaining a high transmission of infrared radiation. According to this embodiment of the invention, the composition preferably comprises: $4*Co<Cr_2O_3<7*Co$. These ranges of contents of chromium and cobalt make it possible to control the production costs of the glass sheet (by optimizing the contribution of chromium and cobalt with respect to the desired effect), while also allowing access to a whole panel of blue colours that are more or less intense up to opacity.

According to another particularly advantageous embodiment of the invention, the composition comprises: $8*Co<Cr_2O_3<14*Co$. Such ranges of contents of chromium and cobalt make it possible to obtain a glass sheet of pleasant, substantially green colour, that is coloured more or less intensively to opaque, with little or no transmission in the visible region, while maintaining a high transmission of infrared radiation. According to this embodiment of the invention, the composition preferably comprises: $9*Co<Cr_2O_3<13*Co$, or even $10*Co<Cr_2O_3<13*Co$. These ranges of contents of chromium and cobalt make it possible to control the production costs of the glass sheet (by optimizing the contribution of chromium and cobalt with respect to the desired effect), while also allowing access to a whole panel of green colours that are more or less intense up to opacity.

According to one advantageous embodiment of the invention, the composition of the glass sheet has a redox of less than 15%. Preferably, the redox is less than 10%, or else less than 5% or even less than 3%.

According to another embodiment of the invention, the composition comprises an $Fe^{2+}$ content (expressed in the form of FeO) of less than 20 ppm. This range of contents makes it possible to obtain properties that are very satisfactory, in particular in terms of transmission of IR radiation, and very particularly advantageous for devices using PSD or FTIR technology. Preferably, the composition comprises an $Fe^{2+}$ content (expressed in the form of FeO) of less than 10 ppm. Very preferably, the composition comprises an $Fe^{2+}$ content (expressed in the form of FeO) of less than 5 ppm.

According to one embodiment of the invention, the glass sheet preferably has a light transmission TLD4 of less than 85%. Preferably, the glass sheet has a light transmission TLD4 of less than 80%, even better still of less than 70% or even of less than 50%. More preferably, for certain applications requiring a very dark colour, the glass sheet has a light transmission TLD4 of less than 10%.

The glass sheet of the invention is coloured. According to a first embodiment, the glass sheet has: $-20<a*<0$; $-2<b*<6$ and $|b*|<|a*|$. This is advantageous since it makes it possible to reproduce the colours of the green glasses on the market, while guaranteeing a high infrared transmission. Preferably, the glass sheet has: $-6.5<a*<-4$; $-0.5<b*<1.5$; which makes it possible to reproduce a light green glass available on the market. Alternatively, also preferably, the glass sheet has: $-11<a*<-5.7$; $0.5<b*<3.5$. More preferably, the glass sheet has: $-10.2<a*<-6.2$; $1.1<b*<3.1$; which makes it possible to reproduce a dark green glass available on the market. Alternatively, also preferably, the glass sheet has: $-17.5<a*<-13$; $-1.5<b*<2$; which makes it possible to reproduce a high-privacy green glass available on the market. According to a second embodiment, the glass sheet has: $-20<a*<0$; $-15<b*<-2$. This is advantageous since it makes it possible to reproduce the colours of the blue glasses on the market, while guaranteeing a high infrared transmission. Preferably, the glass sheet has: $-6<a*<-3$; $-3.5<b*<-2$; which makes it possible to reproduce a light blue glass available on the market. Alternatively, also preferably, the glass sheet has: $-7.5<a*<-4.5$; $-9.5<b*<-6$; which makes it possible to reproduce a dark blue glass available on the market. Alternatively, also preferably, the glass sheet has: $-14<a*<-10$; $-13<b*<-10$; which makes it possible to reproduce a high-privacy blue glass available on the market (e.g. Privablue Glass®).

The glass sheet of the invention has a high transmission of infrared (IR) radiation. More specifically, the glass sheet of the present invention has a high transmission of radiation in the near infrared region (TIR), in a range from 750 to 1200 nm. Preferably, the glass sheet has a transmission TIR4>70%, or >80% or even >85% or even better >87% or >90%.

Advantageously, according to one embodiment, the glass sheet of the invention has TIR4>TLD4+2. Preferably, the glass sheet of the invention has TIR4>TLD4+5, or even better TIR4>TLD4+10. Very preferably, the glass sheet of the invention has TIR4>TLD4+15, or even better TIR4>TLD4+20.

According to another embodiment, the glass sheet of the invention has TIR4>1.05*TLD4 and preferentially TIR4>1.05*TLD4+5 or even better TIR4>1.05*TLD4+10.

According to yet another embodiment, the glass sheet of the invention has TIR4>1.1*TLD4 and preferentially TIR4>1.1*TLD4+5.

According to yet another embodiment, the glass sheet of the invention has TIR4>1.15*TLD4 and even better TIR4>1.2*TLD4.

According to yet another embodiment, the glass sheet of the invention has TIR4>0.95*TLD4+5. Preferably, the glass sheet of the invention has TIR4>0.95*TLD4+10.

According to yet another embodiment, the glass sheet of the invention has TIR4>0.9*TLD4+10. Preferably, the glass sheet of the invention has TIR4>0.9*TLD4+15, or even better TIR4>0.9*TLD4+20.

According to yet another embodiment, the glass sheet of the invention has TIR4>0.85*TLD4+15. Preferably, the glass sheet of the invention has TIR4>0.85*TLD4+20.

According to yet another embodiment, the glass sheet of the invention has TIR4>0.8*TLD4+20.

All the latter embodiments regarding the relationship between TIR4 and TLD4 have the advantage of making the glass sheet of the invention even more anti-selective.

In addition to the transmission TIR, within the context of applications that use for example devices requiring PSD or FTIR technology, in order to quantify the good transmission of the glass in the infrared range at specific wavelengths that are of interest for said applications, use is made of the coefficients of absorption at the wavelengths of 1050, 950 and 850 nm, which must hence be as low as possible in order to obtain a good transmission. The coefficient of absorption is defined by the ratio of the absorbance to the length of the optical path travelled by electromagnetic radiation in a given medium. It is expressed in $m^{-1}$. It is thus independent of the thickness of the material but it is a function of the wavelength of the radiation absorbed and of the chemical nature of the material.

In the case of glass, the coefficient of absorption (ii) at a chosen wavelength λ can be calculated from a measurement of transmission (T) and from the refractive index n of the material (thick=thickness), the values of n, ρ and T being a function of the chosen wavelength λ:

$$\mu = -\frac{1}{thick} \cdot \ln\left[\frac{-(1-\rho)^2 + \sqrt{(1-\rho)^4 + 4 \cdot T^2 \cdot \rho^2}}{2 \cdot T \cdot \rho^2}\right]$$

with $\rho = (n-1)^2/(n+1)^2$

Advantageously, the glass sheet has a coefficient of absorption at the wavelengths of 1050, 950 and 850 nm which is significantly lower than that of a glass from the prior art having an equivalent colour and/or light transmission.

Advantageously, the glass sheet according to the invention has a coefficient of absorption at the wavelength of 1050 nm of less than 5 $m^{-1}$. Preferably, it has a coefficient of absorption at the wavelength of 1050 nm of less than or equal to 2 $m^{-1}$. Very preferably, it has a coefficient of absorption at the wavelength of 1050 nm of less than or equal to 1 $m^{-1}$.

Also advantageously, the glass sheet according to the invention has a coefficient of absorption at the wavelength of 950 nm of less than 5 $m^{-1}$. Preferably, it has a coefficient of absorption at the wavelength of 950 nm of less than or equal to 2 $m^{-1}$. Very preferably, it has a coefficient of absorption at the wavelength of 950 nm of less than or equal to 1 $m^{-1}$.

Also advantageously, the glass sheet according to the invention has a coefficient of absorption at the wavelength of 850 nm of less than 5 $m^{-1}$. Preferably, it has a coefficient of absorption at the wavelength of 850 nm of less than or equal to 2 $m^{-1}$. Very preferably, it has a coefficient of absorption at the wavelength of 850 nm of less than or equal to 1 $m^{-1}$.

The glass sheet according to the invention can advantageously be used in any device requiring glass panels more or less large in size and requiring (i) very good transmission of infrared radiation through said panels, either through the main faces or starting from their edge, and (ii) a colour of green to blue shade that is more or less intense (and hence a moderate to low transmission in the visible region).

For example, the glass sheet according to the invention can advantageously be used in any technology using IR radiation propagating in the edge of the glass. In particular, it can be enhanceable in value in the "Planar Scatter Detection" (PSD) or "Frustrated Total Internal Reflection" (FTIR) optical technology for detecting the position of one or more objects (for example, a finger or a stylus) on a surface of said sheet which, in view of its more or less intense colour, is capable of partially or completely hiding/masking objects/components found behind/under it.

Still as examples, the glass sheet according to the invention can also be enhanced in value:

(1) as decorative panel positioned in front of/around a radiant heating element, hiding (partially or completely) the unattractive side of the heating element but allowing the IR radiation to pass and thus making possible a good output from the heating device (as device, a wall heating device or else an IR cooktop may in particular be considered);

(2) as architectural or decorative spandrel glass;

(3) as pointing device on portable computers (commonly known as "touchpad"), sometimes using a technology requiring infrared radiation. In this case, the glass sheet is preferably very dark, indeed even opaque, in colour and thus hides the electronic components located under it;

(4) as front face element of furniture and in particular of furniture intended to include remote controllable electrical/electronic appliances, hiding from view the unattractive side of such appliances but allowing the signal emitted by the remote controls to pass. This is because the majority of domestic electrical/electronic appliances (televisions, hi-fis, DVD players, games consoles, and the like) are remote controllable using a housing which emits signals in the near infrared region. However, this remote control system exhibits in particular two disadvantages: (i) the signal is often disrupted by the presence of secondary radiation in the visible region (sun, lights), which render it less sensitive, and (ii) it requires that the appliances be reachable by the IR signal of the remote control and thus these cannot be concealed inside an item of furniture, even if demand is nevertheless proceeding in this direction for aesthetic reasons.

Advantageously and according to one embodiment, especially for preventing the phenomenon of solarization, the composition of the glass sheet comprises a cerium (expressed in the form of $CeO_2$) content ≤0.02% by weight with respect to the total weight of the glass. More preferably, the composition of the glass sheet comprises a cerium (expressed in the form of $CeO_2$) content ≤0.01% by weight with respect to the total weight of the glass. More preferably still, the composition of the glass sheet comprises a cerium (expressed in the form of $CeO_2$) content ≤0.005% by weight with respect to the total weight of the glass. Ideally, the composition of the glass sheet is free of cerium (which means that cerium is not intentionally added to the starting materials of the glass and that, if it is present, the cerium content in the composition only reaches the content of an impurity).

Advantageously and according to another embodiment, the composition of the glass sheet comprises a vanadium (expressed in the form of $V_2O_5$) content ≤0.02% by weight with respect to the total weight of the glass. More preferably, the composition of the glass sheet comprises a vanadium (expressed in the form of $V_2O_5$) content ≤0.01% by weight with respect to the total weight of the glass. More preferably still, the composition of the glass sheet comprises a vanadium (expressed in the form of $V_2O_5$) content ≤0.005% by weight with respect to the total weight of the glass. Ideally, the composition of the glass sheet is free of vanadium (which means that vanadium is not intentionally added to the starting materials of the glass and that, if it is present, the vanadium content in the composition only reaches the content of an impurity).

Advantageously and according to another embodiment, the composition of the glass sheet comprises a boron (expressed in the form of $B_2O_3$) content ≤0.01% by weight with respect to the total weight of the glass. More preferably, the composition of the glass sheet comprises a boron (expressed in the form of $B_2O_3$) content ≤0.005% by weight with respect to the total weight of the glass. More preferably, the composition of the glass sheet is free of boron. This means that boron is not intentionally added to the batch starting materials and that, if it is present, the $B_2O_3$ content in the composition of the glass sheet only reaches the level of an impurity unavoidably included in the production.

Advantageously and according to another embodiment, the composition of the glass sheet comprises a lithium (expressed in the form of $Li_2O$) content ≤0.01% by weight with respect to the total weight of the glass. Preferably, the composition of the glass sheet comprises a lithium (expressed in the form of $Li_2O$) content ≤0.005% by weight with respect to the total weight of the glass. More preferably, the composition of the glass sheet is free of lithium. This means that lithium is not intentionally added to the batch starting materials and that, if it is present, the $Li_2O$ content in the composition of the glass sheet only reaches the level of an impurity unavoidably included in the production.

The composition of the glass sheet can also comprise a low proportion of additives (such as agents which help the melting or the refining of the glass) or of components originating from the dissolution of the refractories constituting the melting furnaces.

The glass sheet according to the invention can advantageously be chemically or thermally tempered. It may also be advantageously deformed (for example by thermoforming). A common example is bending, known for glass sheets intended for motor vehicle glazing, but also any other deformation of the glass sheet may be envisaged, without departing from the scope of the invention.

The glass sheet according to the invention may advantageously be laminated with a polymeric interlayer film (generally of PVB) and optionally a second, identical or different, glass sheet in order to form a laminated structure.

The glass sheet according to the invention can also advantageously be coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

The glass sheet can also be coated with at least one antireflection layer. This is advantageous in particular in the case of use of the glass sheet of the invention as front face of a screen. An antireflection layer according to the invention can, for example, be a layer having a low refractive index such as a layer based on porous silica or it can be composed of several layers (stack), in particular a stack of layers of dielectric material, alternating layers having low and high refractive indexes, and terminating in a layer having a low refractive index.

The glass sheet according to the invention can also advantageously be coated with at least one anti-fingerprint layer. This is advantageous in the case of use of the glass sheet of the invention as touch surface. Such a layer can be combined with a transparent and electrically conducting thin layer deposited on the opposite face. Such a layer can be combined with an antireflection layer deposited on the same face, the anti-fingerprint layer being on the outside of the stack and thus covering the antireflection layer.

The glass sheet according to the invention can also be treated on at least one of its main faces, for example by frosting with acid or base, so as to generate anti-fingerprint properties or also antireflection or antiflicker properties, or also by a treatment that generates antibacterial properties (e.g. silver-based treatment). This is also advantageous in particular in the case of use of the glass sheet of the invention as front face of a touch or non-touch screen.

In addition, the invention also relates to a touchscreen or a touch panel or a touchpad comprising at least one glass sheet according to the invention defining a touch surface. According to this embodiment, the touchscreen or the touch panel or the touchpad advantageously uses the FTIR or PSD optical technology. In particular, for a screen, the glass sheet is advantageously fitted above a display surface.

According to the applications and/or properties desired, other layers/other treatments can be deposited/carried out on one and/or the other face of the glass sheet according to the invention.

Finally, the invention also relates to the use of a glass sheet according to the invention in a device using infrared radiation propagating essentially inside said sheet. All the specific embodiments of the glass sheet also apply to the use according to the invention as embodiments of the use.

The term "radiation propagating essentially inside the sheet" is understood to mean radiation which travels in the body of the glass sheet between the two main faces of the sheet.

Advantageously, according to a specific embodiment of the use according to the invention, the propagation of the infrared radiation takes place by total internal reflection. According to this embodiment, the infrared radiation can be injected inside the glass sheet starting from one or more edge(s) of said sheet. The term "edge of the sheet" is understood to mean each of the four surfaces defined by the thickness of the sheet and substantially perpendicular to the two main faces of the sheet. Still according to this embodiment, alternatively, the infrared radiation can be injected inside the glass sheet starting from one or both main face(s) with a certain angle.

The examples which follow illustrate the invention without the intention of limiting its coverage in any way.

EXAMPLES

Various glass sheets according to the invention were prepared or calculated/simulated, in the form of 3 sets, with variable amounts of total iron, chromium and cobalt.

For the preparation of the glass sheets according to the invention: the starting materials were mixed in the powder form and placed in a crucible for the melting, according to an identical base composition specified in the table below, and to which were added starting materials comprising cobalt, chromium and iron in variable amounts as a function of the contents targeted in the final composition (it should be noted that the iron being already, at least in part, present in the starting materials of the base composition as impurity).

| Base composition | Content [% by weight] |
|---|---|
| $SiO_2$ | 71.71 |
| CaO | 8.24 |
| $K_2O$ | 0.02 |
| $Na_2O$ | 14.20 |
| $SO_3$ | 0.33 |
| $Al_2O_3$ | 1.0 |
| MgO | 4.50 |

The optical properties of each composition according to the invention, in the sheet form, were determined on a Perkin Elmer Lambda 950 spectrophotometer equipped with an integrating sphere with a diameter of 150 mm, and in particular:
- the transmission TIR4 was determined according to the ISO 9050 standard for a thickness of 4 mm and for a wavelength range between 780 and 2500 nm;
- the light transmission TLD4 was also determined according to the ISO 9050 standard for a thickness of 4 mm at a solid observation angle of 2° (illuminant D65) and for a wavelength range between 380 and 780 nm;
- the CIE L*a*b* parameters were determined in transmission with the following measurement parameters: illuminant D65, 10°, thickness 5 mm.

The glass sheets from Examples 15-17 and 19-21 were prepared by melting and their optical properties were measured.

The same optical properties were also measured for commercial glass sheets, as comparative examples (5-8, 12-14, 18).

For the simulation of the glass compositions according to the invention: the optical properties of various glass sheets were calculated on the basis of a composition with a low iron content and on the basis of the optical properties of the various colourants (coefficients of absorption given by Bamford's theory). The optical properties of Examples 1-4 and 9-11 are derived from simulation/calculations.

Set 1

Examples 1 to 4 correspond to glass sheets according to the invention. Examples 5 to 8 (comparative examples) correspond to green glasses from the prior art having a high iron content (light green to high-privacy green glass). Each Example 1-4 of composition according to the invention was optimized so as to achieve values of the colorimetric parameters (a*b*) and of the light transmission (TLD4) that are similar to the green glasses offered on the market, but while maximizing the transmission of infrared radiation (TIR4): Example 1 seeks to achieve the colour and the light transmission of Comparative Example 5 (light green glass marketed under the name "Planibel Green"); Example 2 seeks to achieve the colour and the light transmission of Comparative Example 6 (marketed dark green glass); Example 3 seeks to achieve the colour and the light transmission of Comparative Example 7 (other marketed dark green glass) and Example 4 seeks to achieve the colour and the light transmission of Comparative Example 8 (marketed privacy-type very dark green glass).

Table 1 presents the optical properties calculated for Examples 1 to 4 and measured for Examples 5 to 8, and also their respective amounts of iron, chromium and cobalt.

FIG. 1(a) represents the curves in transmission for one and the same glass thickness between the wavelengths 290 and 2500 nm (thus including the visible and near infrared regions) of Examples 1 to 4 according to the invention and of Examples 5 to 8 according to the prior art (light green to high-privacy green glass). FIG. 1(b) represents an enlargement of FIG. 1(a) between the wavelengths 400 and 1250 nm.

TABLE 1

| | $Fe_2O_3$ (ppm) | $Cr_2O_3$ (ppm) | Co (ppm) | µ 850 nm ($m^{-1}$) | µ 950 nm ($m^{-1}$) | µ 1050 nm ($m^{-1}$) | TLD4 (%) | TIR4 (%) | Colorimetric parameters | | |
|---|---|---|---|---|---|---|---|---|---|---|---|
| | | | | | | | | | L* | a* | b* |
| Invention | | | | | | | | | | | |
| 1 | 495 | 330 | 29 | 1.7 | 1.9 | 2.7 | 75.6 | 90.8 | 87.9 | −6.6 | 0.5 |
| 2 | 690 | 470 | 36 | 2.1 | 2.4 | 2.7 | 71.1 | 90.6 | 85.3 | −8.8 | 1.8 |
| 3 | 400 | 545 | 42 | 2.5 | 2.4 | 2.7 | 68.4 | 90.5 | 83.7 | −9.8 | 1.2 |
| 4 | 690 | 1370 | 128 | 7.6 | 8.4 | 9.7 | 41.1 | 87.9 | 64.8 | −18.1 | −1 |
| Comparative | | | | | | | | | | | |
| 5 | 5850 | 8 | 0 | 251.5 | 294.2 | 308.6 | 78 | 35.8 | 89.4 | −7.4 | 0.8 |
| 6 | 8070 | 11 | 0 | 342.8 | 405.6 | 425.9 | 72.8 | 25.6 | 86.4 | −9.7 | 2.4 |
| 7 | 8920 | 13 | 0 | 359.6 | 429.0 | 449.1 | 71.4 | 24 | 85.6 | −10 | 2.2 |
| 8 | 15940 | 242 | 75 | 773.2 | 914.5 | 958.3 | 35.2 | 6.2 | 60 | −18.6 | 0.3 |

The results obtained (see FIG. 1 and Table 1) show that the addition of chromium and cobalt in a content range according to the invention in combination with a low iron content makes it possible to obtain a glass sheet with a green colour that is highly comparable to commercial green glasses, with a light transmission that is very slightly degraded in comparison with these commercial glasses, while very significantly increasing the transmission in the infrared region.

It should be noted that the difference in coefficient of absorption t values between the glasses of Examples 1 to 4 of the invention and Comparative Examples 5 to 8 is truly significant for applications using the propagation of infrared radiation in the edge of the glass, but also if this radiation passed through the thickness through the main faces. In both cases, a decrease, even small, in the absorption of the IR radiation by the glass significantly alters the effectiveness of the technology used, for example alters the sensitivity of a touch panel using a technology such as FTIR or PSD, which can then considerably decrease in the length/width of the panel.

Set 2

Examples 9 to 11 correspond to glass sheets according to the invention. Examples 12 to 14 (comparative examples) correspond to blue glasses from the prior art having a high iron concentration (light blue to high-privacy blue glass). Each Example 9-11 of composition according to the invention was optimized so as to achieve values of the colorimetric parameters (a*b*) and of the light transmission (TLD4) that are similar to the blue glasses offered on the market, but while maximizing the transmission of infrared radiation (TIR4): Example 9 seeks to achieve the colour and the light transmission of Comparative Example 12 (light blue glass marketed under the name "Planibel Azur"); Example 10 seeks to achieve the colour and the light transmission of Comparative Example 13 (dark blue glass marketed under the name "Planibel Darkblue"); and Example 11 seeks to achieve the colour and the light transmission of Comparative Example 14 (privacy-type very dark blue glass marketed under the name "Planibel Privablue").

Table 2 presents the optical properties calculated for Examples 9 to 11 and measured for Examples 12 to 14, and also their respective amounts of total iron, chromium and cobalt.

Figure 2:
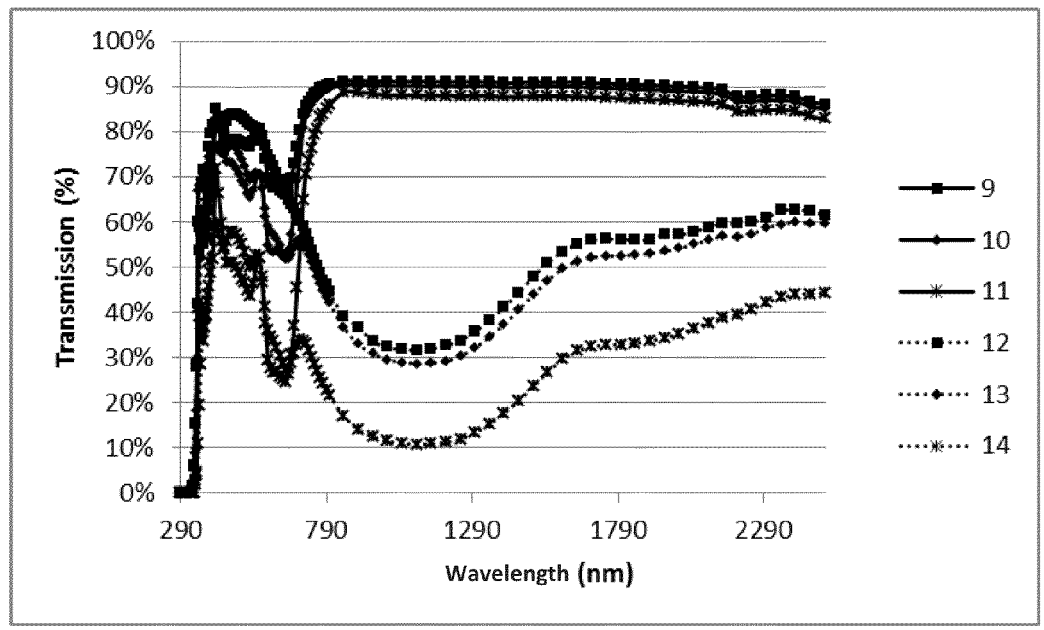
Figure 2:
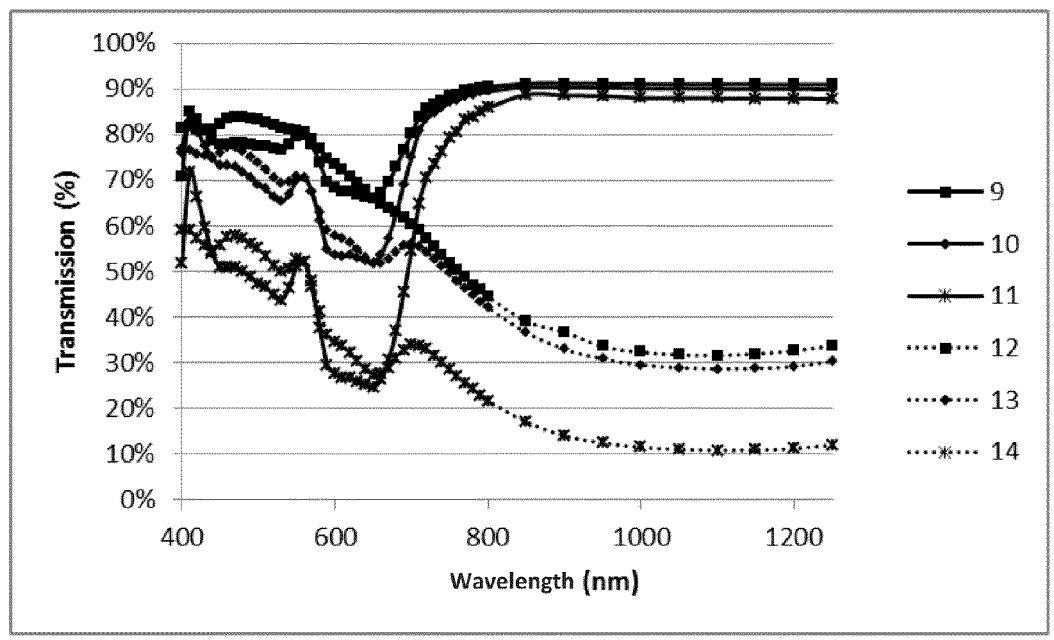

FIG. 2(a) represents the curves in transmission for one and the same glass thickness between the wavelengths 290 and 1750 nm (thus including the visible and near infrared regions) of Examples 9 to 11 according to the invention and of Examples 12 to 14 according to the prior art (light blue to high-privacy blue glass). FIG. 2(b) represents an enlargement of FIG. 2(a) between the wavelengths 400 and 1250 nm.

degraded in comparison with these commercial blue glasses, while very significantly increasing the transmission in the infrared region.

Set 3

Examples 15 to 17 correspond to coloured glass sheets according to the invention, of blue or green colour. Example 18 (comparative example) corresponds to a conventional "clear" glass from the prior art ("Planibel® Clear"), having a relatively high light transmission and also a good transmission of infrared radiation.

Table 3 below presents the optical properties measured for Examples 15 to 18 and also their respective amounts of total iron, chromium and cobalt.

Figure 3:
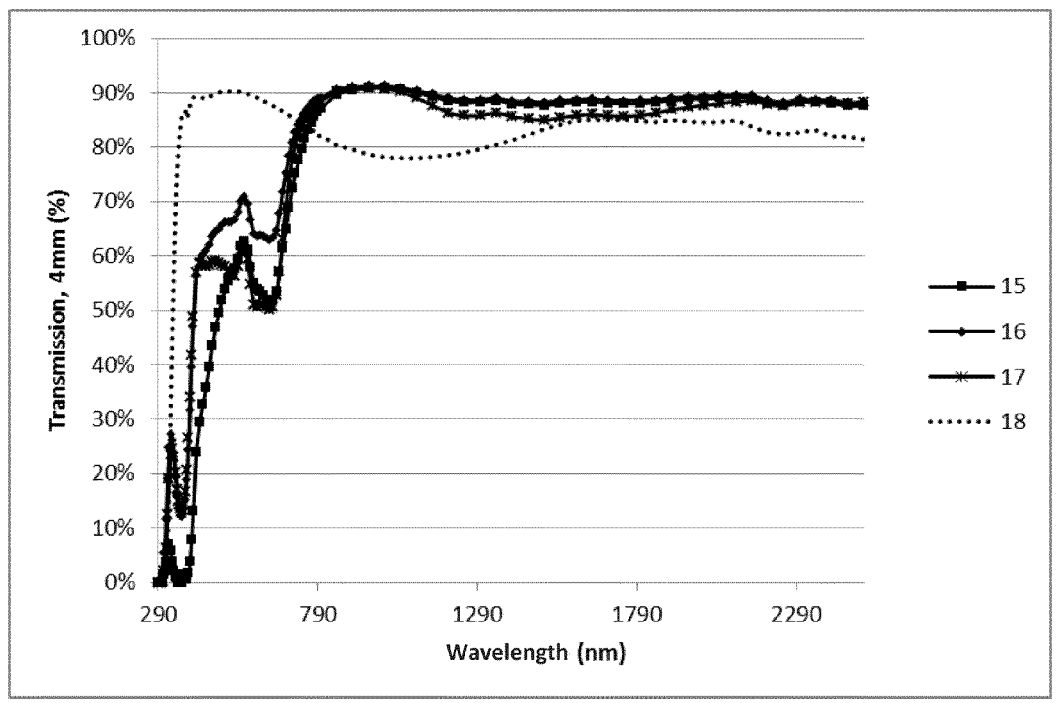
Figure 3:
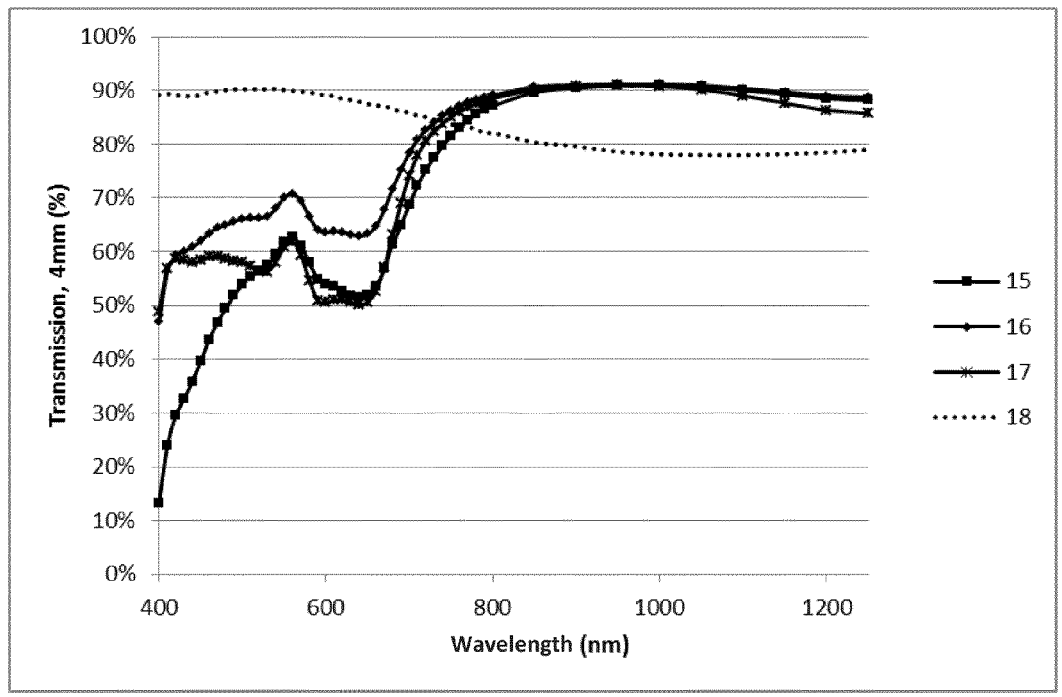

FIG. 3 represents the curves in transmission for one and the same glass thickness between the wavelengths 250 and 2500 nm (thus including the visible and near infrared regions) of Examples 15 to 17 according to the invention and

TABLE 2

| | $Fe_2O_3$ (ppm) | $Cr_2O_3$ (ppm) | Co (ppm) | μ 850 nm $(m^{-1})$ | μ 950 nm $(m^{-1})$ | μ 1050 nm $(m^{-1})$ | TLD4 (%) | TIR4 (%) | Colorimetric parameters | | |
|---|---|---|---|---|---|---|---|---|---|---|---|
| | | | | | | | | | $L^*$ | $a^*$ | $b^*$ |
| | | | | | Invention | | | | | | |
| 9 | 323 | 230 | 36 | 2.1 | 2.4 | 2.7 | 75.3 | 90.8 | 87.9 | −5.1 | −3.3 |
| 10 | 432 | 288 | 73 | 4.4 | 4.8 | 5.5 | 64.2 | 89.8 | 81.5 | −6.3 | −10 |
| 11 | 420 | 840 | 152 | 9.1 | 10.0 | 11.5 | 42 | 87.6 | 66 | −11.7 | −14.2 |
| | | | | | Comparative | | | | | | |
| 12 | 3780 | — | 12 | 214.1 | 252.4 | 266.3 | 78.7 | 40.6 | 89.9 | −6.3 | −3.3 |
| 13 | 5050 | 42 | 46 | 230.3 | 273.5 | 289.7 | 66.7 | 37.5 | 83.1 | −8 | −8.9 |
| 14 | 8770 | 257 | 97 | 422.3 | 501.1 | 531.1 | 46.4 | 18.6 | 69.5 | −14.1 | −11.2 | of Example 18 according to the prior art ("Planibel® Clear" conventional clear glass).

TABLE 3

| | $Fe_2O_3$ ppm | $Cr_2O_3$ ppm | Co ppm | μ 850 nm $(m^{-1})$ | μ 950 nm $(m^{-1})$ | μ 1050 nm $(m^{-1})$ | TLD4 (%) | TIR4 (%) | Colorimetric parameters | | |
|---|---|---|---|---|---|---|---|---|---|---|---|
| | | | | | | | | | $L^*$ | $a^*$ | $b^*$ |
| | | | | | Invention | | | | | | |
| 15 | 310 | 176 | 44 | 6.6 | 3.4 | 4.0 | 66.9 | 89.8 | 82.67 | −4.1 | 4.78 |
| 16 | 410 | 490 | 41 | 3.7 | 2.3 | 3.2 | 57.1 | 89.1 | 76.07 | −9.9 | 20.68 |
| 17 | 460 | 245 | 71 | 5.2 | 3.2 | 5.4 | 56.6 | 88.4 | 76.22 | −4.57 | −2.07 |
| | | | | | Comparative | | | | | | |
| 18 | 850 | 0 | 0 | 33.9 | 39.5 | 41.5 | 89.7 | 80.6 | 95.7 | −1.1 | 0.2 |

The results obtained (see FIG. 1 and Table 1) show that the addition of chromium and cobalt in a content range according to the invention in combination with a low iron content makes it possible to obtain a glass sheet with a blue colour that is highly comparable to the blue glasses from the prior art, with a light transmission that is very slightly The results obtained (see FIG. 3 and Table 3) show that the addition of chromium and cobalt in a content range according to the invention in combination with a low iron content makes it possible to obtain a coloured glass sheet (with a lower $T_L$), while more than significantly increasing its transmission in the infrared region (with respect to the coloured glasses from the corresponding prior art—see sets 1 and 2—but also in comparison with a clear glass from the prior art).

Furthermore, Examples 15 to 17 according to the invention, coloured glass sheets, exhibit coefficients of absorption in the IR region which are lower than those of a clear glass from the prior art (Example 18).

Set 4

Examples 19 to 21 correspond to glass sheets according to the invention, of blue colour.

Table 4 presents the optical properties measured for Examples 19 to 21 and also their respective amounts of iron, chromium and cobalt.

TABLE 4

| | $Fe_2O_3$ ppm | $Cr_2O_3$ ppm | Co ppm | μ 850 nm $(m^{-1})$ | μ 950 nm $(m^{-1})$ | μ 1050 nm $(m^{-1})$ | TLD4 (%) | TIR4 (%) | Colorimetric parameters | | |
|---|---|---|---|---|---|---|---|---|---|---|---|
| | | | | | | | | | L* | a* | b* |
| Invention | | | | | | | | | | | |
| 19 | 740 | 158 | 27 | 8.3 | 9.7 | 11 | 78.1 | 88.1 | 89.4 | −4.7 | −1.3 |
| 20 | 200 | 97 | 33 | 1.9 | 1.7 | 2.7 | 75.7 | 90.3 | 88.1 | −2.1 | −3.1 |
| 21 | 740 | 182 | 35 | 6.8 | 7.9 | 9.5 | 75.7 | 88.3 | 88.1 | −5 | −2.6 |

The invention claimed is:

1. A coloured glass sheet having a composition which comprises, in a content expressed as percentages by total weight of glass:

| base elements: | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20% |
| total iron (expressed in $Fe_2O_3$ form) | 0.02-1% |
| Co | 0.0001-0.025% |
| $Cr_2O_3$ | 0.004-0.5%; | said sheet having: TIR4>TLD4, where TIR4 is the IR transmission (expressed in %) considered (according to the ISO 9050 standard) for a thickness of 4 mm and TLD4 is the light transmission (expressed in %) considered (according to the ISO 9050 standard) with the illuminant D65 for a glass sheet thickness of 4 mm, and wherein said composition comprises: total iron ≤5*$Cr_2O_3$.

2. The glass sheet according to claim 1, wherein said composition comprises: total iron ≤4*$Cr_2O_3$.

3. The glass sheet according to claim 2, wherein said composition comprises: total iron ≤2*$Cr_2O_3$.

4. The glass sheet according to claim 1, wherein said composition comprises a $Cr_2O_3$ content ranging from 0.004-0.15% by weight.

5. The glass sheet according to claim 1, wherein the composition comprises: 0.06%<total iron ≤1%.

6. The glass sheet according to claim 5, wherein the composition comprises: 0.06%<total iron ≤0.3%.

7. The glass sheet according to claim 1, wherein the composition comprises: 0.02%≤total iron ≤0.3%.

8. The glass sheet according to claim 7, wherein the composition comprises: 0.02%≤total iron ≤0.1%.

9. A touchscreen or touch panel or touchpad, comprising at least one glass sheet according to claim 1 defining a touch surface.

10. A screen or panel or pad according to claim 9, using Frustrated Total Internal Reflection (FTIR) or Planar Scatter Detection (PSD) optical technology.

11. A device comprising the glass sheet according to claim 1, wherein the device uses infrared radiation propagation essentially inside said sheet.

12. A device according to claim 11, wherein the propagation of the infrared radiation takes place by total internal reflection.

13. A coloured glass sheet having a composition which comprises, in a content expressed as percentages by total weight of glass:

| base elements: | |
|---|---|
| $SiO_2$ | 60-75% |
| $Al_2O_3$ | 0-6% |
| $B_2O_3$ | 0-4% |
| $Na_2O$ | 5-20% |
| CaO | 0-15% |
| MgO | 0-10% |
| $K_2O$ | 0-10% |
| BaO | 0-5% |
| total iron (expressed in $Fe_2O_3$ form) | 0.02-1% |
| Co | 0.0001-0.025% |
| $Cr_2O_3$ | 0.004-0.5%; | said sheet having: TIR4>TLD4, where TIR4 is the IR transmission (expressed in %) considered (according to the ISO 9050 standard) for a thickness of 4 mm and TLD4 is the light transmission (expressed in %) considered (according to the ISO 9050 standard) with the illuminant D65 for a glass sheet thickness of 4 mm, and wherein said composition comprises: total iron ≤5*$Cr_2O_3$.

14. The glass sheet according to claim 13, wherein the composition comprises: 0.06%<total iron ≤0.3%.

15. The glass sheet according to claim 13, wherein the composition comprises a TIR4 >85%.

16. The glass sheet according to claim 1, wherein the composition comprises a TIR4 >85%.

17. The glass sheet according to claim 13, wherein the glass sheet is a float glass sheet.

18. A touchscreen or touch panel or touchpad, comprising at least one glass sheet according to claim 13 defining a touch surface and using Frustrated Total Internal Reflection (FTIR) or Planar Scatter Detection (PSD) optical technology.

19. A device comprising the glass sheet according to claim 13, wherein the device uses infrared radiation propagation essentially inside said sheet.

* * * * *